United States Patent [19]

Peppers et al.

[11] Patent Number: 5,016,981

[45] Date of Patent: May 21, 1991

[54] MASK

[75] Inventors: Norman A. Peppers, Belmont; James R. Young, Palo Alto; Gerald A. Pierce, Redwood City, all of Calif.; Kazuo Katsuki; Ken Yamashita, both of Osaka, Japan

[73] Assignee: Nippon Sheet Glass Co., Ltd., Osaka, Japan

[21] Appl. No.: 38,636

[22] Filed: Apr. 14, 1987

[51] Int. Cl.$^5$ .................................. G02B 5/22
[52] U.S. Cl. ........................ 350/314; 350/162.13; 250/550
[58] Field of Search ............. 350/311, 314, 321, 322, 350/162.13; 342/64, 101; 250/237 G, 231 SE, 550

[56] References Cited

U.S. PATENT DOCUMENTS

| | | | |
|---|---|---|---|
| 3,193,687 | 7/1965 | Hatcher | 350/314 |
| 4,127,778 | 11/1978 | Leitz | 350/162.13 |
| 4,206,365 | 6/1980 | Leitz | 350/162.13 |

Primary Examiner—Bruce Y. Arnold
Assistant Examiner—Loha Ben
Attorney, Agent, or Firm—Woodcock, Washburn, Kurtz, Mackiewicz & Norris

[57] ABSTRACT

In a mask for transmitting a light subjected to a projection on a predetermined position and for detecting the light, transmittances of the mask are distributed in correspondence with a statistical distribution of the predetermined positions of the light. Information represented by optical signals can be detected with a high probability.

17 Claims, 1 Drawing Sheet

MASK

BACKGROUND OF THE INVENTION

1. Field of the Invention

The present invention relates to a mask for transmitting a light subjected to a projection to a predetermined position and for detecting the light, the mask being suitably applied in an image recognition apparatus such as an OCR (Optical Character Reader).

2. Description of the Prior Art

In the field of optoelectronics, a mask is used to optically extract an optical signal for signal processing, or to optically extract a desired shape from an input image for pattern matching in image recognition by an image recognition apparatus such as an OCR.

In order to prevent a signal mixture and to accurately transmit information, or to prevent blurring of the extracted shape and to obtain a very clear pattern, and further to accurately perform pattern matching of a normalized image, a conventional mask comprises a light-transmitting bright part and a light-reflecting or light-absorbing dark part so as to express binary information. Therefore, the mask pattern must have a very sharp contrast at a boundary between the bright and dark parts.

In general, a mask must be accurately aligned at a position where input light is incident thereon. The light incident position generally must not be deviated.

However, the conventional mask for performing the above-mentioned optical processing has the following drawbacks.

Since a conventional mask has only a binary pattern consisting of the bright and dark parts, only two kinds of information derived from transmission and nontransmission of incident light are obtained. For this reason, light incident on a predetermined position is binarized by the mask, and a photosensor arranged at a position corresponding to that of the mask detects only a binary optical signal.

When light is incident on a position deviated from the proper incident position and is spatially deviated from the mask, light may be incident on the dark part of the mask and is not often detected by the photosensor.

SUMMARY OF THE INVENTION

It is, therefore, an object of the present invention to provide a mask capable of causing a photosensor to detect information represented by a signal from the mask with a high probability even if an actual light incident position is statistically deviated from the proper light incident position.

In the mask according to the present invention, a transmittance distribution is determined in correspondence with a statistical distribution of incident positions of light to be incident on a predetermined position, and thus light incident on the mask can be detected with a probability according to the statistical transmittance distribution.

In the mask according to the present invention, light incident thereon is detected with a probability according to a statistical distribution of incident positions of light. Therefore, even if statistical fluctuations occur in the incident light, information represented by the optical signal can be detected with a high probability.

BRIEF DESCRIPTION OF THE DRAWINGS

FIGS. 1 and 2 show an embodiment wherein the present invention is applied to an optical image recognition apparatus, in which:

FIG. 1 is a schematic view of a reference pattern formed in part of a mask; and

FIG. 2 is a schematic view of a bright line pattern formed in part of a display for optical pattern matching between the bright line pattern and the reference pattern in FIG. 1.

DETAILED DESCRIPTION OF THE PREFERRED EMBODIMENT

An embodiment will be described with reference to FIGS. 1 and 2 wherein the present invention is applied to an optical image recognition apparatus.

In image recognition, projection features (intensity distribution) along different axes are extracted in the feature extraction process. These projection features correspond to vectors in a multi-dimensional vector space (a feature space).

For example, if the projection features comprise n discrete projection data components $a_1, a_2, a_3, \ldots a_n$, these projection data components $a_1, a_2, a_3, \ldots a_n$ correspond to vector components $x_1, x_2, x_3, \ldots x_n$ of n-dimensional vector $x=(x_1, x_2, x_3, \ldots x_n)$, respectively.

In order to perform optical pattern matching between the input image and reference patterns of different types of reference masks, each projection data is quantized at a predetermined quantization level (e.g., one of m quantization levels) according to digital processing. The quantized projection data is displayed as an optical pattern in a predetermined display screen area of a corresponding one of the vector components $x_1, x_2, x_3, \ldots x_n$.

Figure 2:
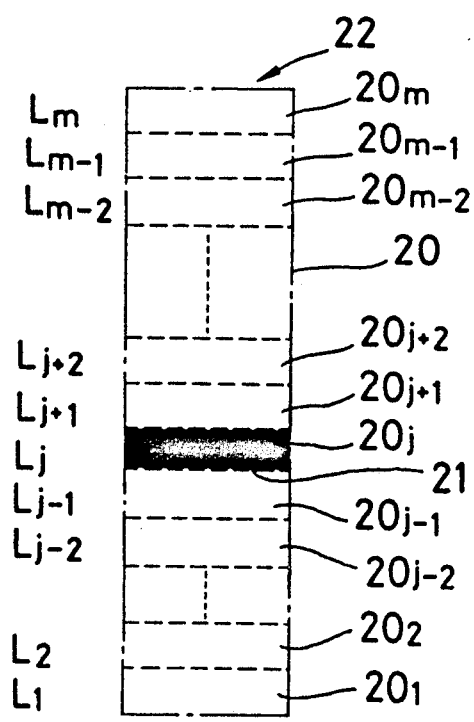

FIG. 2 shows a state wherein a bright line 21 is displayed in an area 20 corresponding to the vector component $x_i$, among a large number of areas assigned to the display screen of the display.

Projection data components $a_1, a_2, \ldots a_n$ respectively corresponding to the vector components $x_1, x_2, \ldots x_n$ are quantized to m quantization levels $L_1, L_2, 1\,1\,1, L_j, \ldots L_m$ (for $L_1 < L_2 < \ldots < L_j < \ldots < L_m$), respectively. Area components $20_1, 20_2, \ldots, 20_j, \ldots 20_m$ respectively correspond to the quantization levels $L_1, L_2, \ldots, L_j, \ldots L_m$. Referring to FIG. 2, the vector component $x_i$ corresponds to the jth quantization level $L_j$, and the bright line 21 is displayed at a position, i.e., the area element $20_j$, proportional to the magnitude of the level $L_j$.

When the bright line 21 is displayed at the position of the quantization level $L_j$ for the area 20, a bright line pattern 22 corresponding to the projection data $a_i$ is formed. In other areas assigned to the display screen, the corresponding bright lines are displayed at different positions of the quantization level, thereby forming the corresponding bright patterns.

Even if an input image is constituted by single patterns, they are often clustered due to variations. If the input image represents characters, it includes many kinds of characters, such as a Gothic type and a Ming type even if they are printed characters. Positional errors and deformation are added to characters if they are handwritten. Therefore, the same characters have statistical variations.

Intensity distribution patterns of the projection features extracted by the same characters are inevitably different from one another, and projection data magnitudes are thus different from one another. The bright line 21 of the bright line pattern 22 in FIG. 2 may not be displayed in the area element $20_j$ but probably displayed in the adjacent area element $20_{20-l}$, $20_{j+l}$, or the like. The bright line 21 may be displayed in the upper or lower area element $20_m$ or $20_l$ although its probability is very low.

In this embodiment, the display position of the bright line 21 corresponding to the projection data $a_i$ is determined according to probability distribution function $P_{ai}(L)$, depending on various expression forms of the input image.

The probability distribution function $P_{ai}(L)$ has m discrete probability values $P_{ai}(L_1)$, $P_{ai}(L_2)$, ..., $P_{ai}(L_j)$, ... $P_{ai}(L_m)$ respectively corresponding to m quantization levels $L_1, L_2, ..., L_j, ... L_m$. The distribution of these values is determined by a discrete probability distribution function (e.g., a binary distribution and a Poisson distribution) or a continuous probability distribution function such as a t-distribution, wherein $$\sum_{k=1}^{m} P_{ai}(L_k) = 1.$$

In the discrete probability distribution function, the number of discrete probability values obtained by the probability distribution function is equal to that of quantization levels. In the continuous probability distribution function, the continuous probability value is quantized into discrete values, the number of which is equal to that of quantization levels.

In either case, the probability distribution function $P_{ai}(L)$ has a maximum probability value $P_{ai}(L_j)$ at the quantization level $L_j$. For this reason, the highest display probability of the bright line 21 is that in the area element $20_j$. The probability values are gradually decreased according to the probability distribution on the basis of predetermined rules when the values are changed in the order of $P_{ai}(L_{j-1}), ..., P_{ai}(L_2), P_{ai}(L_1)$, or $P_{ai}(L_{j+1}), ..., P_{ai}(L_{m-1}), P_{ai}(L_m)$. The display probabilities of the bright line 21 are gradually decreased in the area elements $20_{j-1}, ... 20_2, 20_1$, or $20_{j+1}, ..., 20_{m-1}, 20_m$ according to their probability values.

Bright line display was described in the case of the bright line 21 corresponding to the projection data $a_i$. The magnitude distributions of other projection data components $a_1$ to $a_{i-1}$ and $a_{i+1}$ to $a_m$ follow the probability distribution functions in which the distributions are independent of each other or depend on each other according to the statistical characteristics of the input images. For this reason, the bright lines are displayed at positions corresponding to the probability distribution functions in the areas assigned to the display screen, respectively.

As described above, since the image patterns of the input image have variations, the projection data components to be extracted also statistically vary. In this embodiment, by utilizing the statistical characteristics of the input image, the input image is classified and recognized. For this purpose, areas are assigned to the reference mask in a one-to-one correspondence with the areas which are assigned to the display screen and which correspond to projection data components $a_1, a_2, ... a_n$. In addition, the reference pattern of the gray scale is formed in each area so as to perform optical pattern matching with the bright line patterns.

Figure 1:
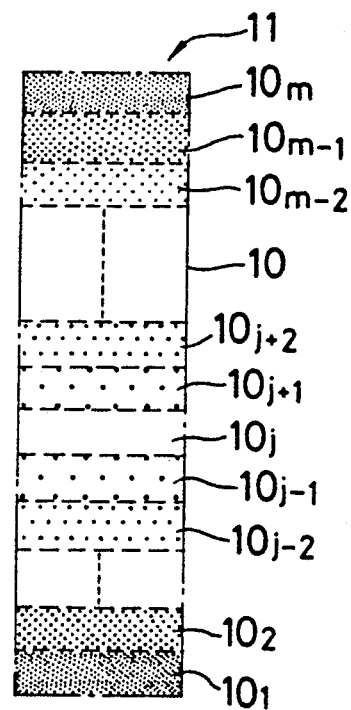

FIG. 1 shows a state wherein, among a large number of areas assigned to the reference mask, the reference pattern 11 is formed in an area 10 corresponding to the area 20 (FIG. 2) so as to perform pattern matching with the bright line pattern 22. As is well known, pattern matching is basically correlation calculations. The reference pattern 11 shown in FIG. 1 serves to auto-correlate with the bright line pattern 22 shown in FIG. 2.

The area 10 of the reference mask comprises area elements $10_1, 10_2, ..., 10_j, ... 10_m$ respectively corresponding to the area elements $20_1, 20_2, ... 20_j, ... 20_m$ of the area 20 of the display screen. The area elements $10_1, 10_2, ..., 10_j, ... 10_m$ respectively have transmittances $\tau_1, \tau_2, \tau_3, ... \tau_m$ proportional to the discrete probability values $P_{ai}(L_1), P_{ai}(L_2), ... P_{ai}(L_j), ... P_{ai}(L_m)$ for the projection data $a_i$.

The area element $10_j$ has a maximum transmittance $\tau_j = 1.0$ corresponding to the maximum probability value $P_{ai}(L_j)$ and comprises a transparent portion shown in FIG. 1. Other area elements $10_1$ to $10_{j-1}$, $10_{j+1}$ to $10_m$ respectively have transmittances $\tau_1$ to $\tau_{j-1}$ and $\tau_{j+1}$ to $\tau_m$ proportional to the values $P_{ai}(L_1)$ to $P_{ai}(L_{j-1}), P_{ai}(L_{j+1})$ to $P_{ai}(L_m)$. Since the probability values satisfy inequality $P_{ai}(L_1) < P_{ai}(L_2) < ... < P_{ai}(L_{j-1})$ and $P_{ai}(L_{j+1}) > ... > P_{ai}(L_m)$, their transmittances also satisfy inequality $\tau_1 < \tau_2 < ... < \tau_{j-1} < 1.0$ and $1.0 > \tau_{j+1}, ... \tau_m$.

The transmittances of the area elements $10_1$ to $10_{j-1}$ and $10_{j+1}$ to $10_m$ are stepwisely decreased according to the predetermined rule complying with the probability distribution function $P_{ai}(L)$ (FIG. 1) as the distance from the area element $10_j$ comprising the transparent portion is increased.

In the area 10, the area element $10_j$ is constituted by a transparent portion, and other area elements $10_1$ to $10_{j-1}$ and $10_{j+1}$ to $10_m$ are constituted by opaque portions whose transmittances are stepwisely decreased, thereby constituting the reference pattern 11 of a gray scale. In other areas of the reference mask, the reference pattern of the gray scale is formed according to the corresponding probability distribution functions. The reference pattern of such a gray scale can be prepared by utilizing photographic techniques.

Pattern matching between the bright line pattern displayed on the display and the reference pattern formed as the gray scale on the reference mask can be performed such that the reference mask is brought into tight contact with the screen of the display. In this case, the areas assigned to the display have the same sizes as those of the areas of the reference masks in a one-to-one correspondence. When the area 20 of the display and the area 10 of the reference mask are taken as an example, the area elements $20_1, 20_2, ..., 20_j, ... 20_m$ respectively have the same sizes as those of the area elements $10_1, 10_2, ... 10_j, ... 10_m$.

When the reference mask is slightly separated from the screen of the display, the shape of the areas of the reference mask is preferably similar to that of the display.

The input images having identical contents have various expression formats, and statistical variations occur in the projection data magnitudes, i.e., statistical fluctuations occur therein. For this reason, the actual display position of the bright line is deviated from the proper position having the highest display probability. Even in this case, since the reference pattern is constituted by a gray scale, optical pattern matching between the reference pattern and the bright line pattern can be effectively performed.

In the case of the area 10, since the reference pattern 11 is constituted by a gray scale, light output from the bright line 21 passes with a high probability through the area element $10_j$ (transmittance $\tau_j = 1.0$) as the transparent portion upon optical pattern matching, or is semi-transmitted with a slightly lower probability through the area element $10_{j-1}$ or $10_{j+1}$ whose transmittance is slightly lower than the adjacent area element $10_j$. If the bright line 21 is displayed in the area element $20_j$, optical pattern matching between the image information corresponding to the area 20 and the reference pattern 11 results in a lowest statistical error rate.

Even in other areas of the reference mask, lights from the bright lines are transmitted or semi-transmitted according to the degree of pattern matching. In image recognition of this embodiment, different types of reference masks required for class classification and recognition are prepared. In pattern matching between the reference masks and the bright line patterns displayed on the display, the same optical effect as described above can be obtained.

Light passing through each reference mask is detected by the photosensor to perform class classification and recognition of the input image with a high probability.

In the above embodiment, the transmittances of the reference pattern have a stepwise distribution proportional to the discrete probability values of the probability distribution function $P_{ai}(L)$ associated with the projection data $a_i$. However, according to the technical concept of the present invention, the transmittances of the reference pattern 11 can be constituted by a continuous distribution.

If the probability distribution function $P_{ai}(L)$ is a continuous probability distribution such as a normal distribution or a t-distribution, a position corresponding to the maximum probability value $P_{ai}(L_j)$ comprises a transparent portion having transmittance $\tau_j = 1.0$, and a portion adjacent to the transparent portion is constituted by an opaque portion whose transmittance is continuously decreased in proportion to $P_{ai}(L)$. In this case, the bright line can be displayed on the area of the display in the same levels (m) as in the above embodiment. Alternatively, the number of levels may be larger than m.

The entire distribution of the projection data $a_i$ based on the probability distribution function $P_{ai}(L)$ corresponds to the distribution of transmittances of the reference pattern 11. However, the entire distribution of projection data $a_i$ need not correspond to the distribution of transmittances of the reference pattern 11. More specifically, the transmittances of the reference pattern 11 may be distributed around the maximum probability value $P_{ai}(L_j)$ in the probability distribution function $P_{ai}(L)$.

With this arrangement, for example, if projection data $a_i$ has statistical variations according to the normal distribution, the function $P_{ai}(L)$ covers the ranges of $\mu \pm \sigma$, $\mu \pm \sigma$, $\mu \pm \sigma$ or the like where $\mu$ is the average value, and $\sigma$ is the standard deviation. The excessive portion which cannot be covered by the function $P_{ai}(L)$ is constituted by a light-reflecting or light-absorbing portion having a transmittance $\tau = 0.0$.

In the above embodiment, the contrast of the reference patron 11 has the same polarity as that of the bright line pattern 22. However, the opposite polarity may be employed.

The present invention is applicable to detection of an object whose characteristics are statistically changed, in addition to class classification and recognition of the image such as a character or any other figure.

What is claimed is:

1. A mask for transmitting a predetermined optical image composed of at least one projection component for display on a display screen, said projection component having a shape and location subject to statistical variations, said mask comprising:
   (a) a first area of maximum transmittance $\tau_j$ corresponding in shape to said shape of said projection component; and
   (b) a second area of transmittance $\tau_{j-1}$ less than said maximum transmittance $\tau_j$, said transmittances of said first and second areas selected as a function of the probability of said projection component being projected onto said areas.

2. A mask as recited in claim 1, further comprising a third area of transmittance $\tau_{j+1}$ less than said maximum transmittance $\tau_j$.

3. A mask as recited in claim 2, wherein said transmittances are distributed stepwisely.

4. A mask as recited in claim 2, wherein said transmittances are distributed continuously.

5. A mask as recited in claim 3 or 4, wherein said first area has a size corresponding to the size of said projection component.

6. A mask as recited in claim 3 or 4, wherein said transmittances $\tau_{j-1}$, $\tau_j$, $\tau_{j+1}$ are proportional to the probabilities of said projection component being projected onto said second, first and third areas, respectively.

7. A mask as recited in claim 6, wherein said maximum transmittance $\tau_j$ is approximately 1.0.

8. A mask as recited in claim 2, further comprising m−3 additional areas, each area having a transmittance less than said maximum transmittance, wherein m represents a number of discrete probability values corresponding to the respective probabilities of said projection component being projected onto said additional areas.

9. An optical image recognition apparatus for recognizing an optical image composed of at least one projection component having an intensity, an expected shape and location subject to statistical variations, said apparatus comprising:
   (a) a mask for transmitting said projection component, comprising:
      (i) a first area of maximum transmittance $\tau_j$ corresponding in shape to said expected shape of said projection component; and
      (ii) a second area of transmittance $\tau_{j-1}$ less than said maximum transmittance $\tau_j$, said transmittances of said first and second areas selected as a function of the probability of said projection component being projected onto said areas;
   (b) display means for displaying said optical image, comprising a number m of display areas, m corresponding to a number of discrete probability values, each probability value representing the statistical probability of said projection component having a particular intensity after transmission through said mask; and
   (c) detecting means coupled to said display means, for detecting the intensity of said projection component after transmission through said mask and displaying said projection component on an area of sad display means corresponding to the detected intensity value.

10. An optical image recognition apparatus as recited in claim 9, further comprising a third area of transmittance $\tau_{j+1}$ less than said maximum transmittance $\tau_j$.

11. An optical image recognition apparatus as recited in claim 10, wherein said transmittances are distributed stepwisely.

12. An optical image recognition apparatus as recited in claim 10, wherein said transmittances are distributed continuously.

13. An optical image recognition apparatus as recited in claim 11 or 18, wherein said first area has a size corresponding to the size of said projection component.

14. An optical image recognition apparatus as recited in claim 11 or 12, wherein said transmittances $\tau_{j-1}$, $\tau_j, \tau_{j+1}$ are proportional to the probabilities of said projection component being projected onto said second, first and third areas, respectively.

15. An optical image recognition apparatus as recited in claim 14, wherein said maximum transmittance $\tau_j$ is approximately 1.0.

16. An optical image recognition apparatus as recited in claim 15, further comprising m-3 additional areas, each are having a transmittance less than said maximum transmittance, wherein m represents a number of discrete probability values corresponding to the respective probabilities of said projection component being projected onto said additional areas.

17. A method for masking an optical image composed of at least one projection component having a shape and location subject to statistical variations, the method comprising the steps of:

(a) masking said projection component with a mask comprising a first area of maximum transmittance $\tau_j$ corresponding in shape to said shape of said projection component and a second area of transmittance $\tau_{j-1}$ less than said maximum transmittance $\tau_j$, said transmittances of said first and second areas selected as a function of the probability of said projection component being projected onto said areas;

(b) detecting the intensity of said projection component after transmission through said mask; and (c) displaying said projection component on an area of a display screen corresponding to the detected intensity value, said display screen comprising a number m of display areas, m corresponding to a number of discrete probability values each of which represents the statistical probability of said projection component having a particular intensity after transmission through said mask.

* * * * *